United States Patent [19]

Noguchi et al.

[11] 4,186,341

[45] Jan. 29, 1980

[54] MAGNETIC DEVELOPING AGENT LEVEL DETECTION APPARATUS USING AN OSCILLATOR WHOSE FREQUENCY IS CONTROLLED BY THE LEVEL

[75] Inventors: Koichi Noguchi, Machida; Kunio Hibi, Yokohama, both of Japan

[73] Assignee: Ricoh Company, Ltd., Japan

[21] Appl. No.: 884,532

[22] Filed: Mar. 8, 1978

[30] Foreign Application Priority Data

Mar. 10, 1977 [JP] Japan .................................. 52-25406
Mar. 10, 1977 [JP] Japan .................................. 52-25407
Mar. 10, 1977 [JP] Japan .................................. 52-25408

[51] Int. Cl.$^2$ ............................................. G01F 23/28
[52] U.S. Cl. .................................. 324/236; 324/204; 222/DIG. 1; 340/617; 340/195; 222/64; 118/712

[58] Field of Search .................................. 118/7, 9, 10; 73/DIG. 5; 222/DIG. 1, 64, 65, 66; 340/195, 612, 617, 618; 137/392, 554, 558; 324/204, 236

[56] References Cited

U.S. PATENT DOCUMENTS

| 3,511,580 | 5/1970 | Eckhardt et al. | 324/204 |
| 3,588,859 | 6/1971 | Petrec | 137/392 |
| 3,853,246 | 12/1974 | Dubois | 222/DIG. 1 |

Primary Examiner—Robert J. Corcoran
Assistant Examiner—Walter Snow
Attorney, Agent, or Firm—McGlew and Tuttle

[57] ABSTRACT

In detecting the presence or absence of a developing agent or determining the residual amount thereof, at least one coil is arranged outside a developing agent container, so that a change in magnetic permeability caused by the presence or absence of a developing agent within the container or a change in the amount thereof can be detected as a change in the inductance of the coil.

10 Claims, 14 Drawing Figures

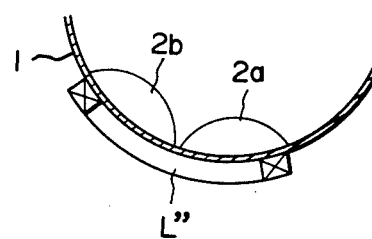
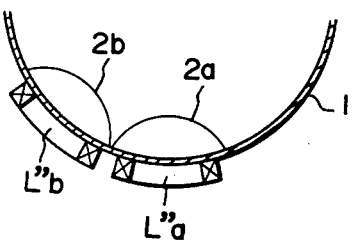
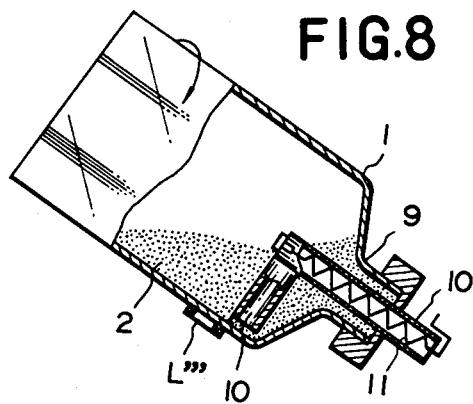

MAGNETIC DEVELOPING AGENT LEVEL DETECTION APPARATUS USING AN OSCILLATOR WHOSE FREQUENCY IS CONTROLLED BY THE LEVEL

BACKGROUND OF THE INVENTION

This invention relates in general to developing devices of electrophotographic printing apparatus, and more particularly the invention is concerned with a method and an apparatus for detecting the presence or absence of a developing agent within a developing agent container for dispensing the developing agent or for determining the residual amount thereof within such a container.

In a developing device of the dry developing agent type for an electrophotographic copying apparatus, for example, it is necessary to continuously supply a developing agent to a developing station to compensate for the consumption of the developing agent required for effecting copying, in order to keep the constant density of images formed by copying. To meet this requirement, it is essential that the developing agent be present in the developing agent container at all times. If the container becomes empty, then the absence of the developing agent should be detected and the container should be replenished with a fresh supply of developing agent at once. However, a difficulty is encountered in accurately determining and indicating the residual amount of the developing agent of the dry type within the container because such a developing agent tends to form into solid masses. In one method known in the art for determining the residual amount of the developing agent, the container is made of a transparent material so as to enable the operator to determine the residual amount by visual examination. However, since the operator is unable to keep the residual amount of the developing agent under surveillance at all times, there is no guarantee that the residual amount can be determined accurately by this method.

Proposals have hitherto been made to use various methods for detecting the presence or absence of a developing agent which vary depending on the types of the developing agents to be handled.

For example, one method consists in measuring the weight of the container in detecting the presence or absence of a developing agent. Another method relies on the detection of the liquid level in the container when the developing agent is in a liquid state, still another method uses a permanent magnet for determining a magnetic attracting force thereof for the developing agent when the agent contains a magnetic carrier, and a further method utilizes a change in the impedance between two electrodes, with one being mounted in the container and the other on the wall of the container. However, these methods of the prior art all have defects. Accurate determination of the residual amount of a developing agent is hampered by mechanical vibration in the case of the method consisting in measuring the weight of the container, by fluctuations in the liquid level in the case of the method relying on the detection of the liquid level, and by the lack of fluidity of the developing agent containing a magnetic carrier in the case of the method relying on the determination of a magnetic attracting force of a permanent magnet when the residual amount of the developing agent approaches a level at which a further supply of the developing agent to the container is necessitated.

The method utilizing the magnetic attracting force of a permanent magnet mounted in the vicinity of a toner container for the magnetic developing agent has disadvantages, in addition to the aforementioned disadvantage, in that the spilled developing agent adheres to the magnet and weakens its attracting force and causes a misoperation to occur and that the attracting force of the magnet interferes with the fluidity of the developing agent. In the case of a magnetic developing agent, the use of a magnetism sensing switch which is subjected to the magnetic flux from the magnet may be conceived for determining the residual amount of the developing agent. However, this method also has the aforementioned disadvantages associated with the use of the magnet.

SUMMARY OF THE INVENTION

One object of the present invention is to provide a method and an apparatus for automatically and accurately determining the residual amount of a developing agent within a developing agent container which obviate the aforementioned disadvantages of the prior art.

Another object is to provide a method and an apparatus for determining the residual amount of a developing agent which magnetically determines the residual amount of the developing agent by using at least one electromagnetic coil.

The present invention is based on the recognition that, when the developing agent is one which contains a magnetic carrier or in which the toner itself has magnetism (these two types of developing agent will be hereinafter referred to as a magnetic developing agent), the inductance of an electromagnetic coil undergoes changes when there are variations in the residual amount of the magnetic developing agent or when the magnetic developing agent is depleted. The aforementioned objects are accomplished by utilizing the changes in the inductance of an electromagnetic coil which cause variations in the oscillation frequency of an oscillator, so that the residual amount of the magnetic developing agent can be determined on the basis of the frequency of the oscillator.

Particularly, the invention obviates, by utilizing changes in the inductance of an electromagnetic coil, the aforementioned disadvantages of the detecting method using the magnetic attracting force of a permanent magnet, and is capable of achieving excellent results in detecting the presence or absence of a magnetic developing agent or determining the residual amount thereof in a developing agent container.

BRIEF DESCRIPTION OF THE DRAWINGS

FIG. 6 is a fragmentary view corresponding to FIG. 5 but showing another embodiment of the invention;

FIG. 7 is a view corresponding to FIG. 6 but showing still another embodiment of the invention;

FIG. 8 is a front sectional view of still another embodiment;

DESCRIPTION OF THE PREFERRED EMBODIMENTS

Figure 1:
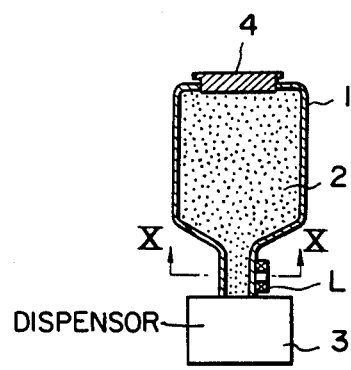
FIG. 1 is a schematic view of a magnetic developing agent feed system in which the present invention is incorporated.

The invention will now be described with reference to various embodiments thereof shown in the accompanying drawings. In FIG. 1, a developing agent container 1 made of a nonmagnetic material contains therein a magnetic developing agent 2 which is dispensed little by little by a developing agent dispensing mechanism 3 attached to an outlet port at the lower end of the container 1 and supplied to a developing station, not shown, of a copying apparatus. Mounted adjacent the outer periphery of the lower portion of the outer periphery of the container 1 is a detection coil L which is adapted determine the residual amount of the developing agent 2 within the container 1. The numeral 4 designates a port formed in the upper end of the container 1 and a lid therefor, the port being used for replenishing the container 1 with a developing agent when the developing agent in the container 1 is depleted.

Figure 2:
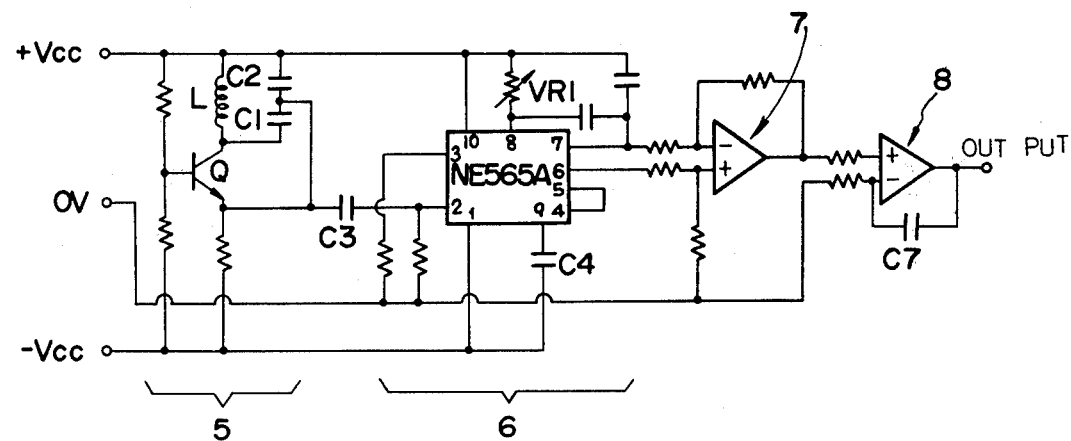
FIG. 2 is a diagram showing one example of the circuit of the apparatus for determining the residual amount of a magnetic developing agent.

The detection coil L, which is a resonance element of an oscillator, is connected, for example, to capacitors C1 and C2 as shown in FIG. 2 and constitutes a Colpitts oscillator 5 together with a transistor Q. The inductance of the detection coil L undergoes variations in accordance with the presence or absence of the magnetic carrier or magnetic toner of the developing agent 2 or of the residual amount thereof, and the oscillation frequency of the oscillator 5 also undergoes variations accordingly. The oscillation frequency is low when the developing agent 2 is present within the container 1, and becomes high as the amount of the developing agent 2 is reduced. The reason why a nonmagnetic material is used for constructing the container 1 is that, if a magnetic material were used for this purpose the inductance would be very little or have no variations. It is desirable that the container 1 be made of an insulating material of nonmagnetic nature in order to reduce the loss of output of the oscillator 5.

The output of the oscillator 5 is input, through a coupling capacitor C3, to a demodulator 6 which includes a phase-locked loop integrated circuit NE565A (a trade mark of Signetics Corporation) functioning to convert, into a DC current, the difference between a frequency f1 which is determined by a variable resistor VR1 and the time constant of a capacitor C4 and a frequency f2 input through the coupling capacitor C3. The frequency f1 is set at such a level that the output of the demodulator 6 is brought to a low level when the developing agent 2 is present within the container 1 and brought to a high level when the developing agent is depleted, by the variable resistor VR1. However, if necessary, the frequency f1 may be set at any other value as desired.

The output of the demodulator 6 is buffered by an amplifier 7 and input to an integrator 8 which detects the output voltage of the amplifier 7 while removing noise caused by the low fluidity of the developing agent 2 and produces a developing agent residual amount detection signal.

The present invention contemplates the determination of the residual amount of the magnetic developing agent on the basis of variations in oscillation frequency caused by changes in the inductance of the detection coil L. Therefore, the invention enables the determination to be effected accurately and positively without interfering with the flow of the developing agent. The use of a magnet arranged in the vicinity of a developing agent container would necessitate the use of means for agitating a magnetic developing agent because the magnetic developing agent is influenced by the magnetic attracting force of the magnet and held in one position. The invention dispenses with such agitating means. Also, since the oscillation frequency of the oscillator 5 shows subtle changes depending on the residual amount of the developing agent, it is possible to determine the residual amount at any time as desired. Thus by positioning the detection coil L at any vertical level as desired relative to the container 1, it is possible to determine the residual amount of the developing agent at any level as desired.

Figure 3:
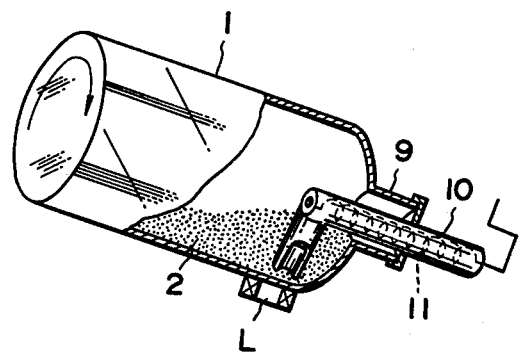
FIG. 3 is a front perspective view of an apparatus which comprises a detection coil for determining the residual amount of a developing agent within a developing agent container.

The container 1 may be supported by support means (not shown) in a tilting position as shown in FIG. 3 and rotated in the direction of an arrow so as to dispense the developing agent 2 through a dispensing port 9 formed at the lower end of the container 1. When this is the case, the developing agent 2 will be gradually moved downwardly by gravity as its amount is reduced. The developing agent thus moved downwardly and collected at the bottom of the container 1 is scooped up by a dispenser tube 10 which is rotatably supported. The developing agent scooped up by the dispenser tube 10 is agitated and mixed together by a swirling member 11 mounted within the tube 10 before being discharged through an outlet port of the tube 10. Therefore, if the detection coil L which is a constituent of the oscillator 5 is arranged in juxtaposed relation to the outer periphery of the lowest portion of the container 1 in which the developing agent 1 gathers together, it is possible to determine the residual amount of the developing agent 2 based on the oscillation frequency which undergoes a change as the inductance of the detection coil L varies in accordance with a change in the residual amount of the developing agent 2.

Figure 4:
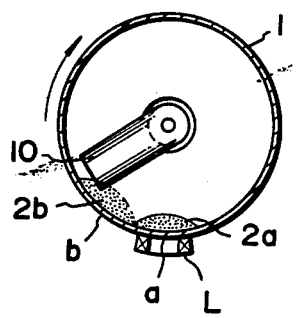
FIG. 4 is a side view of the apparatus shown in FIG. 3.

However, when the residual amount of the developing agent 2 becomes small, the developing agent 2 forms a mass which is disposed in a position a as shown in FIG. 4 in case the container 1 remains stationary, but the mass of developing agent 2 shows a phenomenon such that it moves slightly together with the container 1 to a position b due to frictional dragging and remains in position b as the container 1 rotates. Therefore, if the detection coil L is disposed in juxtaposed relation to position a, a misoperation of the residual amount determining apparatus would occur in which the apparatus would give an indication of the absence of the developing agent 2 while the dispensing device is operative and the container 1 is rotating, and would give an indication of the presence of the residual amount when the container 1 stops rotating. This problem can be solved by arranging the detection coil L in a position which is slightly displaced in the direction of rotation of the container 1 from the position in which the developing agent 2 gathers together when the container 1 is stationary.

Figure 5:
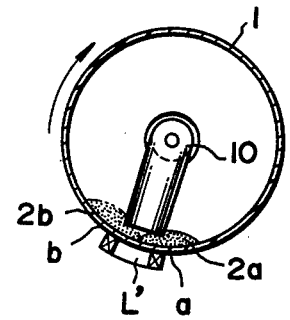
FIG. 5 is a view similar to FIG. 4 but showing another embodiment of the apparatus according to the invention.

In the event that the mass $2a$ of the developing agent 2 gathering together in position a when the container 1 is stationary and the mass $2b$ of the developing agent 2 gathering together in position b when the container 1 rotates partly overlap as shown in FIG. 5, it is possible to determine the residual amount of the developing agent 2 substantially accurately regardless of whether the container 1 is stationary or rotating, if a detection coil L' is arranged such that it is juxtaposed against the overlapping portion of the masses $2a$ and $2b$.

In the event that the mass $2a$ of the developing agent gathering together in position a when the container 1 is stationary is completely separated from the mass $2b$ of the developing agent 2 gathering together in position b when the container 1 rotates, because of the velocity of rotation of the container 1 or the fluidity of the developing agent 2 as shown in FIG. 6, the desired effect can be achieved if a detection coil L'' larger in size than the detection coil L' is used and arranged in a position slightly displaced from the mass $2a$ and substantially corresponding to the position of the detection coil L' shown in FIG. 5.

If it is not desirable to increase the size of the detection coil L'', the detection coil L'' may be divided into two detection coils L''a and L''b as shown in FIG. 7. The coil L''a detects the residual amount of the developing agent 2 primarily when the container 1 is stationary and the coil L''b detects the residual amount of the developing agent 2 primarily when the container 1 is rotating, and the resultant inductance of the two detection coils L''a and L''b is detected. By this arrangement, it is possible to achieve the same effect as achieved when a single detection coil is used. Also, this arrangement makes it possible to accurately determine the residual amount even when the residual amount in the container 1 has become very small.

In the container 1 shown in FIG. 3, a hollow space or cavity tends to be temporarily formed immediately after the dispenser tube 10 rotates through the mass of developing agent 2 while scooping up a quantity of the developing agent 2, if the residual amount of the developing agent 2 becomes small. Generally, the dispenser tube 10 is constructed such that it can scoop up the developing agent 2 from the lowest portion of the collected developing agent 2. However, if the detection coil L is arranged in juxtaposition against the path of travel of the forward end of the scooping portion of the rotating dispenser tube 10, there is the danger of the residual amount being misjudged because the detection coil L will give an indication of the absence of the developing agent 2 each time the dispenser tube 10 passes by the detection coil L in its rotary motion. Also, if the rotating dispenser tube 10 stops in juxtaposition against the detection coil L, then there is a possibility that the result of detection does not indicate the actual condition of the developing agent 2.

The aforementioned problem can be solved by arranging the detection coil L in a position which is spaced apart from the path of movement of the forward end of the scooping portion of the developing agent dispenser tube 10 or other dispensing device for the developing agent 2 as shown in FIG. 8. Since the detection coil L''' is disposed in a position which is out of the path of movement of the forward end of the scooping portion of the developing agent dispenser tube 10, the coil L2' is not affected by a cavity which would be temporarily created in the wake of the rotating dispenser tube 10 and can accurately determine the residual amount of the developing agent 2 within the container 1, no matter where the dispenser tube 10 may stop rotating.

Preferably, the detection coil L''' is arranged in a position which is slightly displaced axially upwardly from the scooping portion of the dispenser tube 10, by taking into consideration the need to increase the efficiency with which the developing agent 2 can be dispensed.

In the arrangement shown in FIG. 1 in which the container 1 is arranged in an upright position and the developing agent 2 is dispensed through the bottom of the container 1 by means of the dispensing mechanism 1, the same effect as described above can be achieved by arranging the detection coil L in a position which is slightly above the dispensing mechanism 3.

In the case of a developing agent dispensing device of the interchangeable developing agent container type, there is the drawback of the dispensed developing agent dropping outside the developing tank in the developing station unless the replacing container is correctly set in the predetermined position, because the dispensing port of the replacing container is not indexed with the developing agent tank in this case.

Figure 9:
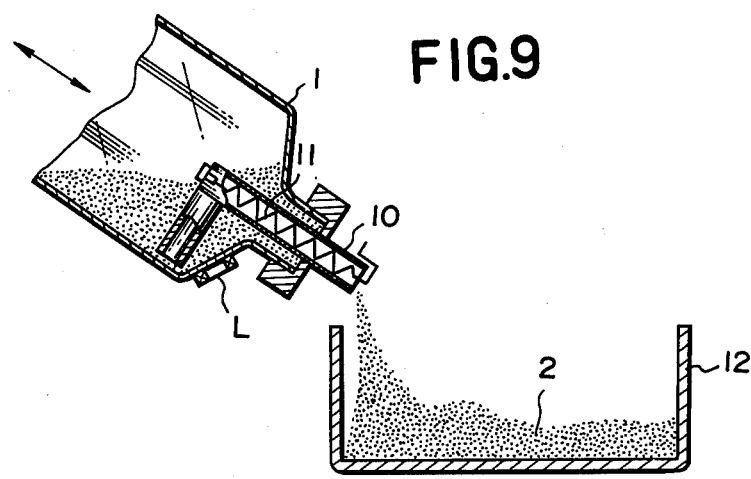
FIG. 9 is a front sectional view of still another embodiment.

In FIG. 9, an electrostatic latent image on a photosensitive member (not shown) is developed by the developing agent 2 in a developing agent tank 12. As the developing agent 2 is consumed by a developing operation, the developing agent tank 12 receives a fresh supply of developing agent 2 from the developing agent container 1.

When the developing agent container 1 is mounted in place in a tilting position as shown in FIG. 9, the dispenser tube 10 is mounted in the dispensing port in the lower portion of the container 1, and the container 1 and dispenser tube 10 are supported for rotation relative to each other.

As the dispenser tube 10 rotates, the developing agent disposed in the lowermost position of the container 1 is scooped by the scooping portion of the tube 10 and supplied through the dispensing port of the container 1 to the developing tank 12 while the developing agent is agitated and mixed well by the swirling member 11 while passing through the tube 10.

The detection coil L is arranged in a juxtaposition against the outer periphery of the lowermost portion of the container 1, and the residual amount of the developing agent 2 within the container 1 is detected on the basis of variations in the oscillation frequency of the oscillator which are caused by changes in the inductance of the coil L.

The detection coil L is fixed in place and adapted to be disposed in the predetermined position even if the old container 1 is replaced by a new container 1 by withdrawing the old container and inserting the new one in the directions of arrows.

If the developing agent within the container 1 is depleted, then the oscillation frequency of the oscillator 5 indicates that no developing agent is present within the container 1. Upon the empty container 1 being replaced by a new container 1 containing a predetermined quantity of developing agent therein, the presence of the developing agent therein, is detected by the detection coil L and indication is given that there is a presence of developing agent within the container 1. If the replaced new container 1 is not set in the correct position, the coil L will be spaced from the outer periphery of the container 1 a distance which is greater than a predetermined distance. The existence of a greater distance than the predetermined distance between the coil L and the container 1 makes it impossible for the coil L to detect the amount of the developing agent, and such a situation is analogous to the situation in which there is no developing agent within the container 1. Thus an indication is given that there is no developing agent. If it is possible to detect, either visually or by weighing the container, that the replaced container 1 contains a developing agent therein, the operator can detect the abnormality because the absence of the developing agent is indicated in spite of the fact that the developing agent is contained in the container. Stated differently, improper mounting of the replaced container 1 can be detected, so that the operator can mount the replaced container in the correct position.

Thus by positioning the detection coil L in such a manner that the residual amount can be determined in a normal way when the replaced container 1 is correctly mounted and the absence of the developing agent is indicated when the replaced container 1 is improperly positioned, it is possible not only to determine correctly the residual amount of the developing agent 2 but also to detect whether the replaced container is correctly positioned.

Figure 10:
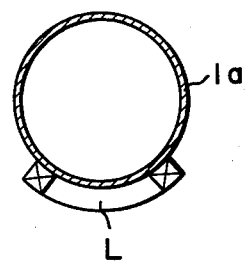
FIG. 10 is a sectional view taken along the line X—X in FIG. 1.
Figure 11:
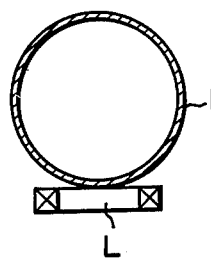
FIG. 11 is a sectional view showing a defect of an apparatus having no relevance to the invention.

In the detecting apparatus according to the invention, it is advantageous that the detection coil L be shaped such that it conforms to the shape of the outer periphery 1a of the container 1, in order that the magnetic flux produced by the coil L can satisfactorily penetrate the developing agent 2 within the container 1 and can increase the degree of a change in the oscillation frequency of the oscillator 5 which would be caused by the presence or absence of the developing agent 2. In case the container 1 is cylindrical in shape, the coil L will be circularly arcuate in shape as shown in FIG. 10 so as to conform to the outer periphery 1a. This brings the outer periphery 1a into conformity with the magnetic flux generating surface of the coil L, so that the magnetic flux will penetrate the developing agent 2 within the container 1 and enable changes in the oscillation frequency of the oscillator 5 to be detected accurately. In FIG. 11, there is shown a detection coil L of a shape which does not meet the aforementioned requirement. It will be understood that the magnetic flux is kept from satisfactorily penetrating the developing agent 2 within the container 1 in the case of the detection coil L of the shape shown in FIG. 11.

Figure 12:
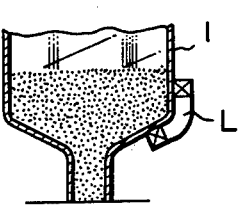
FIG. 12 is a schematic front view of still another embodiment.
Figure 13:
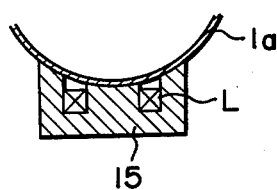
FIG. 13 is a sectional view of still another embodiment.
Figure 14:
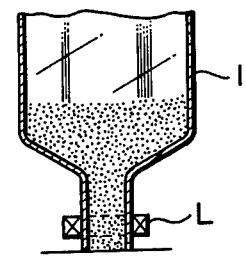
FIG. 14 is a schematic front view of a further embodiment.

In case the container 1 is not cylindrical in shape, the coil L has only to be constructed such that its shape may conform to the shape of the outer periphery of the container 1. Also, the coil L may be shaped and arranged such that it conforms to the curved surface of the shoulder of the container 1 as shown in FIG. 12. If the coil L is of the type which has a core, the core may be shaped to conform to the shape of the outer periphery of the container 1 as shown in FIG. 13, which shows a core 15 of the E type having an outer end shaped to conform to the outer periphery 1a of the container 1. As is well known, the core is made of a material of high magnetic permeability, and the use of a core has the effect of enhancing the magnetic force penetrating the developing agent within the container 1. FIG. 14 shows an example in which the coil L is wound on the container 1. The arrangement shown in FIG. 14 is advantageous because the magnetic flux positively passes through the developing agent in the container 1.

While specific embodiments of the invention have been shown and described in detail to illustrate the application of the principles of the invention, it will be understood that the invention may be embodied otherwise without departing from such principles.

What is claimed is:

1. An apparatus for determining the residual amount of a magnetic developing agent comprising, in combination, a container, of non-magnetic material, to contain the magnetic developing agent, said container arranged in a tilted position and mounted for rotation; an oscillator including at least one detection coil serving as a resonance element thereof for producing a detection frequency, said at least one detection coil being arranged in juxtaposition against the lowermost portion of said container; and a detection circuit connected to said oscillator, including means for producing a preset frequency, and including means for comparing the detection frequency with the preset frequency for determining the residual amount of the magnetic developing agent within said container based on a difference between the detection and preset frequencies.

2. An apparatus as claimed in claim 1, wherein said nonmagnetic container has a dispenser tube rotatably mounted therein having a scooping portion for scooping the developing agent; said at least one detection coil being arranged adjacent the outer periphery of the container in a position which is displaced axially upwardly of the path of movement of the forward end of said scooping portion of said dispenser tube.

3. An apparatus as claimed in claim 1, wherein said at least one detection coil is shaped to conform to the curved surface of the outer periphery of said container.

4. An apparatus as claimed in claim 1, wherein said at least one detection coil has a core which is shaped to conform to the curved surface of the outer periphery of said container.

5. An apparatus as claimed in claim 1, wherein said at least one detection coil is arranged so that it encloses the outer periphery of the lowermost portion of said container.

6. An apparatus as claimed in claim 1, wherein said detection circuit comprises, a demodulator connected to said means for comparing, an amplifier connected to said demodulator, and an integrator connected to said amplifier.

7. An apparatus as claimed in claim 1, wherein said at least one detection coil is a single coil of a size such that the coil extends through a circumferential extent of the outer periphery of the container including a position in which the residual developing agent is located when the container is stationary and a position to which the residual developing agent moves as the container rotates.

8. An apparatus as claimed in claim 1, wherein said nonmagnetic container is axially removable from a predetermined position, and said at least one detection coil is arranged adjacent the outer periphery of the container in juxtaposition with that lowermost portion of the container in which the residual developing agent is located when the container is mounted in such predetermined position, the position of the at least one detection coil being selected so that the residual amount of the developing agent can be determined only when the spacing, between a position in which the container is mounted again after being withdrawn for refilling and the position of the at least one detection coil, is in a predetermined range.

9. An apparatus as claimed in claim 1, wherein said at least one detection coil is arranged in a position, adjacent the outer periphery of said non-magnetic container where a residual amount of developing agent in said container is located when said container is rotated.

10. An apparatus as claimed in claim 1, wherein said oscillator includes an additional detection coil connected in series with said at least one detection coil, one of said detection coils being arranged adjacent a position in which a residual amount of developing agent is located when said container is stationary and the other detection coil is arranged adjacent a position in which a residual amount of developing agent is located when said container rotates, wherein a residual amount of the developing agent is detected based on the resultant inductance of said at least one and said additional detection coils.

* * * * *